June 12, 1962 M. J. CIVITANO 3,038,965

TELEPHONE SIGNAL DEVICE AND THE LIKE

Filed Jan. 22, 1959

INVENTOR.
Michael J. Civitano

BY

Peter Fries, Jr.
ATTORNEY 3,038,965
TELEPHONE SIGNAL DEVICE AND THE LIKE
Michael J. Civitano, 1244 44th St., Brooklyn, N.Y.
Filed Jan. 22, 1959, Ser. No. 792,247
4 Claims. (Cl. 179—1)

This invention relates to improvements in telephone devices ad accessories and the like.

An object of the invention is to provide a telephone device whereby when an incoming telephone call signal is received at a local station, the local apparatus circuits are opened, so that the party on the outside who is making the incoming call, is enabled to listen to the room where the local telephone receiver is installed, automatically, whether the local telephone is manually answered or not.

Another object of the invention is to provide a telephone device whereby, when an incoming telephone call is made by an outside calling party, to a local telephone, the effect of the ringing current which normally would ring the local telephone bell, is instead used to actuate electromagnetic means for opening the circuit to the local telephone, so that the outside calling party can listen in to the room in which the local telephone is situated, without intervention by any person therein.

A further object of the invention is to provide a telephone device which is in effect a safety device, in that, for example, when a child is left alone in a home for a short time, unavoidably, the parent can make a telephone call to the home, and, without employing the local bell which might awaken the child on receiving the incoming ringing signal, he instead employs the ringing current to actuate electromagnetic means in the local telephone for opening the circuits just as though a person in the home had lifted the receiver, and when this occurs, the parent can listen in and hear all sounds in the bedroom, including that of the sleeping child breathing.

Still another object of the invention is to provide a novel and improved telephone device and accessory, in which there is a local switch on the local telephone, which, when actuated, disconnects the local bell from the circuit, and connects the ringing current incoming terminals to electromagnetic means in the telephone, whereby the furnishing of a ringing signal on making a call from the outside to that local telephone, will employ said ringing signal current for opening the circuits from the incoming line to the telephone transmitter and/or receiver for operation during the call.

Still a further object of the invention is to provide a novel and improved telephone instrument and device of the character described, which is simple in design, inexpensive to manufacture, and which may be installed on existing telephone devices at low cost, or employed in making new devices.

These and other objects and advantages of the invention will become apparent from the following description of a preferred form of the invention, as illustrated in the accompanying drawings, forming a part hereof, and in which.

It is frequently necessary for parents to return to their homes to check on whether small children left home are asleep or otherwise in safe condition. Similarly, a person who owns a store may wish to see whether a burglar or prowler is moving about therein at night or when the store is closed. The present invention makes it possible for such persons to listen in to their homes or store or other premises on the local telephone circuit, by merely making an outside toll or local call from an outside telephone to the telephone in the home or store. By the arrangement of the circuit of the device, when a switch on the telephone for this purpose is turned to a position for this purpose, the making of the outside call actuates a ringing generator in the central station which transmits a ringing current to the local telephone in the premises, my device shifting the ringing current so that it does not operate the local telephone bell, but instead operates electromagnetic means in the telephone to open the circuit to the local telephone transmitter and/or receiver, so that the outside calling party can actually listen in to the room or other premises in which the local telephone is placed, and thus ascertain to his own satisfaction whether any unusual noise or sound requires him to return immediately to handle safety or other conditions existing.

As long as the particular switch on the telephone is in normal position, the telephone may be used in the usual manner, and its bell will ring on any incoming call. But when the particular switch is shifted to another position, then the making of an incoming call, will not ring the bell, but rather will open the receiver and transmitter circuits to the line, that is will connect them to the line for use in listening in.

Such a device can be connected to existing telephone instruments, by inclusion within the casing of the instrument base or carried thereon, with a switch means mounted for being turned from normal to special listening position when such service is desired, as when the parents leave the home. It may also be incorporated right in telephone instruments when manufactured, so that they are ready for use, by the subscribers. It is apparent that this may be done easily and at low cost per instrument.

In order to understand clearly the nature of the invention, and the best means for carrying it out, reference may be had to the drawings, in which like numerals denote similar parts throughout the several views.

Figure 1:
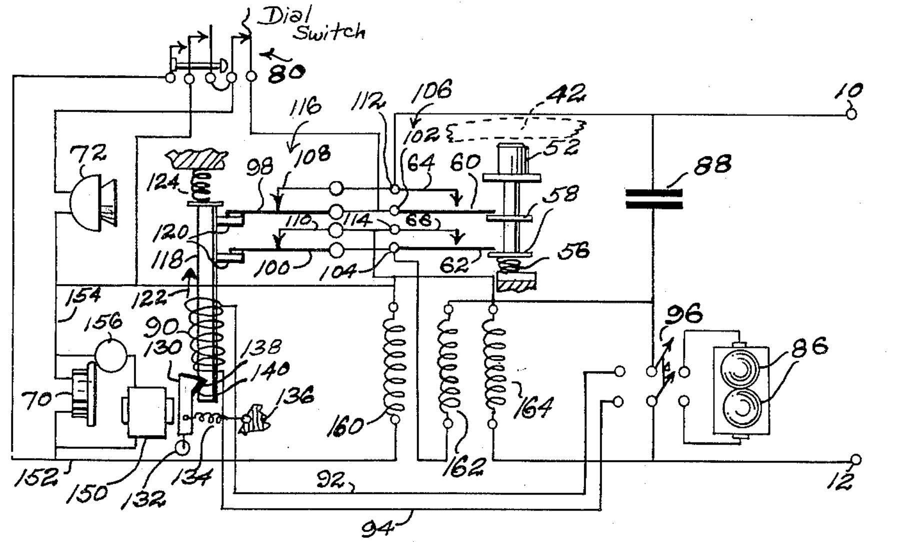
FIGURE 1 is a schematic circuit diagram of a telephone instrument embodying the invention.

As shown in FIGURE 1, there is a schematic diagram of a telephone instrument, with two incoming line terminals 10 and 12 which are connectable to the two lines going to the central station of the telephone system, at which the various outgoing lines radiate in turn to other local instruments connected to the system. Suitable sources of electrical power are connected into the system to energize the various instruments as is well known in the art. This is conveniently done by locating such batteries or the like in the central station of the telephone company.

Figure 2:
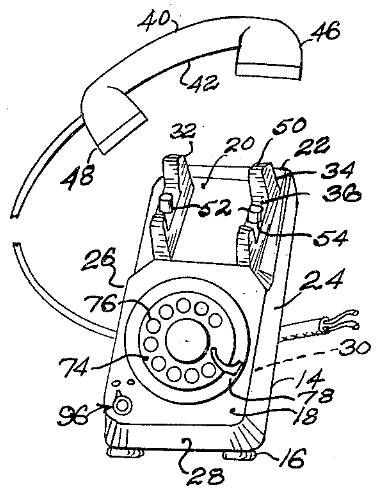
FIGURE 2 is a perspective view showing an instrument according to FIGURE 1, within its housing, the handset being elevated from the cradle for clarity of illustration.

In the instrument shown in FIGURE 1, schematically, and also in FIGURE 2 as an actual housed instrument, there is a main housing 14, supported on feet 16 of any suitable material, for absorbing vibrations, etc., and formed with a face plate portion 18 in prominently arranged disposition facing the operator or user of the device.

The housing may be formed so that there is a roof portion 20 extending rearwardly of the face plate portion 18, and merging integrally with the rear wall 22, while the portion 18 merges smoothly with the depending side walls 24 and 26, and the front wall 28. It is thus seen that there is formed a downwardly open main chamber 30 inside the main housing, in which the other portions of the instrument may be disposed or supported. A pair of upstanding support rails 32 and 34 is carried on the roof portion 20, in spaced relation, and are recessed as at 36 to define aligned passageways for the support and reception of the cradled handset 40, the neck portion 42 of which is made relatively slender to fit between the rails 32 and 34, and the recesses 36 to be cradled therein, with its earpiece casing 46 and mouthpiece casing 48 carried on outer ends of the neck portion 42, so as to lie outside the support rails 32 and 34 when supported thereon. The formation of the recesses in the rails provides upstanding lugs 50 which support the handset 40 against movement.

It is seen from FIGURE 2, that there are a pair of push buttons 52 projecting out of openings 54 in the rails 32 and 34, and from FIGURE 1 is seen that the push buttons are biased upwardly by springs 56 in any suitable manner, and carry collars 58 for closing the switch blades 60 and 62, normally opened, against stationary terminals 64 and 66, the blades 60 and 62 being made of resilient material such as spring brass, copper, and the like. When the weight of the cradle 40 is supported on the push buttons 52, it is sufficient to press them down and open the circuits from terminals 64 and 66, thus opening the circuits to the receiver 70 and carbon button transmitter 72, the receiver being electromagnetic as is known in the art. The dial 74 is mounted rotatably on its axis, by insertion of the finger of the user in each of the numbered and lettered holes such as 76 of the rotary dial, and moving the same until the finger, in clockwise direction, contacts the finger stop 78, whereupon the finger is withdrawn, and the spring driven mechanism causes the dial to interrupt at switch 80, the number of times corresponding to the hole 76 into which the finger was inserted and withdrawn. This transmits a series of impulses to the central station, to actuate the stepper relays and ultimately to cause corresponding dialing of the number being called at the other central station. As such stepper relays are well known in the art, they will not be further described herein.

When an incoming call is being received, the first indication is the reception of the ringing low frequency alternating current from the ringing generators of the central station so that normally the responsive bells 86, connected in series with the condenser 88, are actuated thereby, and ring audibly. But in the present apparatus, such low frequency alternating current from the ringing generators is employed for other purposes, namely to actuate and close the switch terminals 64 and 66 to close with terminals 60 and 62. This is done by diverting the ringing current from the bells, to the solenoid 90, through wires 92 and 94 by means of switch blades at 96, so as to pass the ringing current to the solenoid 90 by flipping switch 96 to the left as seen in FIGURE 1.

As seen best in FIGURES 1 and 2, while the actuating plungers 52 are normally maintained in depressed position when the handset 40 is placed in the cradle of the device, it is desired nevertheless to obtain the same effect in the circuit as if the handset had been lifted off the plungers 52, as for example if an incoming call had rung the bells 86, and the party there lifted the handset to see who is calling. For this purpose, I provide a pair of spring switch blades 98 and 100 connected to terminals 102 and 104 respectively, of the main instrument cradle switch 106, to which the main switch blades 60 and 62 are also connected. I also provide stationary contacts 108 and 110 for closing engagement with the blades 98 and 100, and connected respectively to the main cradle switch terminals 112 and 114. The spring switch blades 98 and 100 are arranged so that they are normally open, and out of contact with stationary contacts 108 and 110, due to the resilience of the blades 98 and 100. In order to close the auxiliary switch 116, involving contacts 98, 108, and 100 and 110, I provide suitable means, in electromagnetic form, schematically shown as the solenoid coil 90 and plunger 118, with switch closing lugs 120 carried by and movable with the iron plunger 118 in the direction of arrow 122, when the solenoid 90 is energized from the ringing current. A spring 124 normally biases the solenoid plunger 118 downwardly to leave blades 98 and 100 in open positions, but when the solenoid coil is energized, the flux moves the plunger 118 upwardly as seen in FIGURE 1, so that lugs 120 close blades 98 and 100 with stationary contacts 108 and 110 respectively. At the same time, means is provided for maintaining the closure of blades 98 and 100.

This may be carried out in any suitable manner, as for example by means of a detent 130 pivoted at 132, and normally biased clockwise about pivot 132 by means of tension spring 134 secured to a frame portion 136. As shown, the detent has a prong 138 which is pulled into the detent recess 140 by the spring 134 when in registry with the recess, so as to hold the solenoid plunger 118 in upper switch closing position as shown in full lines in FIGURE 1, when energized by a ringing signal received by wires 92 and 94 when switch 96 is moved to the left to close with the wires 92 and 94 respectively.

The result of such ringing signal, instead of ringing the bells 86, is to actuate the solenoid 90, and close the switch 116, just as though a person at the local station had lifted the telephone receiver or handset from plungers 52. This permits the calling party to listen in, while the switch 116 remains closed, and thus to hear if any unusual sounds are to be heard, or whether the "all quiet" indication shows that the children are safe and sound in their beds.

When the desired indication is observed by the calling parents or the like persons, they may hang up their handset at the calling end of the line, with a view to disconnecting the connection, and opening switch 116. To accomplish this, various alternatives are available to the party. One is to make use of the dial tone which is heard in the earphone 70 of the local station when the calling party hangs up, the dial tone being an audio frequency signal of on the order of about 800 cycles per second or so.

As this dial tone appears across the earphone 70, it is apparent that it may be used for actuating a relay to release the solenoid plunger 118, and allow the spring 124 to push it down to open switch 116. For this purpose, I may place a solenoid coil 15 0across the wires 152 and 154, for intercepting such signal tone, and the solenoid 150 may be wound for being actuated by the minute electrical current of such tone. Suitable filter means indicated at 156 may be interconnected in the circuit for aiding in efficiently diverting the dial tone to actuation of the coil 150, to pull detent 130 to the left, and disengaging the plunger 118, allowing spring 124 to open switch 116. At 156 may also be indicated suitable amplifier means, such as transistor amplifier means with suitable small local power supply as is well known in the art, for enhancing the actuation power of the dial tone for releasing the detent 130. Suitable induction and choke coils are shown at 160, 162 and 164, as is well known in the art, with suitable cores being provided as needed.

By use of the presently disclosed device, it is seen that parents, who are away from home in the evening, or during the day may call in and see or hear from any sounds heard, whether things are all right at home or whether they should return home. Although I have disclosed my invention in specific form, it is understood that various changes may be made in size, shape, materials and arrangement without departing from the spirit and scope of the invention as claimed.

I claim:

1. A telephone instrument comprising a main base, a cradle on said base and constructed and arranged for supporting a handset including telephone receiver and transmitter when not in use, transformer means in said base for connecting said receiver and transmitter to the incoming line circuit, first switch means interposed in the circuit of said receiver and transmitter for normally connecting said receiver and transmitter to the circuit when in use, and including spring biased switch opening means disposed for being depressed by said handset weight when on the said cradle, and for closing on lifting of the handset, to connect said receiver and transmitter and activate them, signal bell means in said base, filter connecting means between said signal bell means and said line circuit for delivering only ringing signals to the bell means, and second means constructed and arranged for diverting said ringing signals from the said bell means, and in response to a ringing signal from the line, connecting said receiver and transmitter to the line circuit while said handset remains on said cradle, so that said transmitter is actuated for transmitting to the line circuit any audible sounds at the location of the instrument, and wherein said second means comprises a second switch similar in connections to said first switch means and connected across said terminals thereof, said second switch means being normally open, relay means for closing said second switch, bypass switch means for diverting any ringing signal current from said signal bell means to said relay means for closing said second switch when a signal bell current is received from the line circuit, whereby said receiver and transmitter are connected to the active line circuit, and means constructed and arranged for maintaining said second switch in closing position and for returning said second switch to open position, and wherein said last named means comprises spring biased detent means constructed and arranged for releasably locking said relay means and with it said second switch, in switch closing position when said ringing current is received from the line circuit, and means responsive to another signal impulse from the line circuit for retracting said detent means, allowing said relay means to open said second switch.

2. The construction according to claim 1, wherein said means responsive to another signal impulse comprises solenoid means for retracting said detent means, and means connecting said solenoid means for receiving said another signal impulse to actuate the same, said solenoid means being constructed and arranged for actuation from said another signal impulse.

3. The construction according to claim 2, wherein said solenoid means is connected to said telephone receiver for receiving therefrom a busy signal from the line circuit which follows closing of the said second switch and the hanging up at a remote calling station by the party who made the incoming call which furnished the ringing signal, and means interposed between the solenoid means and telephone receiver for causing actuation of said solenoid means from said busy signal.

4. A telephone instrument comprising a main base, a cradle on said base and constructed and arranged for supporting a handset including telephone receiver and transmitter when not in use, transformer means in said base for connecting said receiver and transmitter to the incoming line circuit, first switch means interposed in the circuit of said receiver and transmitter for normally connecting said receiver and transmitter to the circuit when in use, and including spring biased switch opening means disposed for being depressed by said handset weight when on the said cradle, and for closing on lifting of the handset, to connect said receiver and transmitter and activate them, signal bell means in said base, filter connecting means between said signal bell means and said line circuit for delivering only ringing signals to the bell means, and second means constructed and arranged for diverting said ringing signals from the said bell means, and in response to a ringing signal from the line, connecting said receiver and transmitter to the line circuit while said handset remains on said cradle, so that said transmitter is actuated for transmitting to the line circuit any audible sounds at the location of the instrument, and wherein said second means comprises a second switch similar in connections to said first switch means and connected across said terminals thereof, said second switch means being normally open, relay means for closing said second switch, bypass switch means for diverting any ringing signal current from said signal bell means to said relay means for closing said second switch when a signal bell current is received from the line circuit, whereby said receiver and transmitter are connected to the active line circuit, and means constructed and arranged for maintaining said second switch in closed position and for returning said second switch to open position, and wherein said last named means comprises time delay means constructed and arranged for holding said second switch closed for a predetermined time interval, and for opening the same thereafter.

References Cited in the file of this patent

UNITED STATES PATENTS

| | | |
|---|---|---|
| 2,826,636 | Beatty | Mar. 11, 1958 |
| 2,898,405 | Eck | Aug. 4, 1959 |